US011740186B2

(12) United States Patent
Woo (10) Patent No.: US 11,740,186 B2
(45) Date of Patent: Aug. 29, 2023

(54) IMAGE ACQUIRING METHOD, IMAGE ACQUIRING APPARATUS AND WAFER INSPECTION APPARATUS

(71) Applicant: SEMES CO., LTD., Cheonan-si (KR)

(72) Inventor: Myoung Hoon Woo, Cheonan-si (KR)

(73) Assignee: SEMES CO., LTD., Cheonan-si (KR)

( * ) Notice: Subject to any disclaimer, the term of this patent is extended or adjusted under 35 U.S.C. 154(b) by 180 days.

(21) Appl. No.: 17/406,784

(22) Filed: Aug. 19, 2021

(65) Prior Publication Data

US 2022/0065799 A1 Mar. 3, 2022

(30) Foreign Application Priority Data

Aug. 31, 2020 (KR) ......................... 10-2020-0110414

(51) Int. Cl.
*G01N 21/95* (2006.01)
*G01N 21/956* (2006.01)
(Continued)

(52) U.S. Cl.
CPC ... *G01N 21/95607* (2013.01); *G01N 21/8806* (2013.01); *G01N 21/9501* (2013.01);
(Continued)

(58) Field of Classification Search
CPC ......... G01N 21/95607; G01N 21/8806; G01N 21/9501; G01N 2021/8887; G01N 21/95684; G01N 21/01; G01N 2021/0112; G01N 2021/177; G06T 7/001; G06T 7/11; G06T 2207/30148; G06T 2207/10016; G06T 7/33; G06T 2200/32;
(Continued)

(56) References Cited

U.S. PATENT DOCUMENTS 8,160,351 B2 * 4/2012 Sandstrom ........... G01N 21/956
356/237.4
9,157,869 B2 * 10/2015 Ortner ................ G01N 21/9505
(Continued)

FOREIGN PATENT DOCUMENTS

JP 6616040 12/2019
KR 10-2005-0074810 7/2005
(Continued)

OTHER PUBLICATIONS

Korean Office Action with English translation for Korean Patent Application No. 10-2020-0110414, dated Feb. 28, 2023.

*Primary Examiner* — Roy M Punnoose
(74) *Attorney, Agent, or Firm* — Kile Park Reed & Houtteman PLLC (57) ABSTRACT

An image acquiring method, an image acquiring apparatus and a wafer inspection apparatus are disclosed. A line scan camera is disposed above a transfer path of a wafer to continuously acquire partial images having a predetermined size by imaging a scan area including a portion of the transfer path, and the partial images are stored in an image storage unit. A partial image including a predetermined feature point among the partial images is detected by an image analysis unit, and an image merging unit merges a predetermined number of partial images including the detected partial image to acquire an entire image of the wafer. An image inspection unit analyzes the entire image of the wafer to detect defects in the wafer.

20 Claims, 6 Drawing Sheets

(51) Int. Cl.
  *G06T 7/00* (2017.01)
  *G01N 21/88* (2006.01)
  *G06T 7/11* (2017.01)

(52) U.S. Cl.
  CPC ............... *G06T 7/001* (2013.01); *G06T 7/11* (2017.01); *G01N 2021/8887* (2013.01); *G06T 2207/30148* (2013.01)

(58) Field of Classification Search
  CPC ............ G06T 2207/20221; G06T 3/40; G06T 7/0004; H01L 22/12; H01L 22/20
  See application file for complete search history.

(56) References Cited

U.S. PATENT DOCUMENTS

2009/0257646 A1* 10/2009 Moon ................. G01R 31/311
  382/149
2012/0307236 A1* 12/2012 Ortner ................ G01N 21/9505
  356/239.3
2015/0285745 A1  10/2015 Srocka

FOREIGN PATENT DOCUMENTS

| KR | 10-0580188 | 5/2006 |
| KR | 10-0700927 | 3/2007 |
| KR | 10-2014-0031742 | 3/2014 |

\* cited by examiner

IMAGE ACQUIRING METHOD, IMAGE ACQUIRING APPARATUS AND WAFER INSPECTION APPARATUS

CROSS-REFERENCE TO RELATED APPLICATION

This application claims the priority benefit of Korean Patent Application No. 10-2020-0110414, filed on Aug. 31, 2020, and all the benefits accruing therefrom under 35 U.S.C. § 119, the contents of which are incorporated by reference in their entirety.

TECHNICAL FIELD

The present disclosure relates to an image acquiring method, an image acquiring apparatus and a wafer inspection apparatus. More specifically, the present disclosure relates to a method of acquiring an image of a wafer while transferring the wafer in a manufacturing process of semiconductor devices, an apparatus for acquiring the image and an apparatus for inspecting the wafer using the image.

BACKGROUND

Semiconductor devices may be formed on a substrate such as a silicon wafer by repeatedly performing a series of manufacturing processes. For example, in order to manufacture the semiconductor devices, various manufacturing processes, such as a deposition process for forming a thin layer on a wafer, a photolithography process for patterning the thin layer to form electrical circuits, a planarization process for planarizing the thin layer, etc., may be performed on the wafer.

Apparatuses for performing the manufacturing processes may transfer the wafer along a predetermined transfer path using a wafer transfer robot. The apparatuses may be equipped with an image acquisition apparatus that acquires an image of the wafer while transferring the wafer for the purpose of inspecting the wafer. For example, a line scan camera may be disposed above the transfer path of the wafer, and the line scan camera may acquire an image of the wafer moving along the transfer path.

As an example, the line scan camera may be operated by a trigger signal such as a wafer detection signal provided from a sensor for detecting the wafer and an encoder signal of the wafer transfer robot. However, it may be difficult to obtain an intact wafer image due to an error or delay of a trigger signal.

SUMMARY

Embodiments of the present invention provide an image acquiring method and an image acquiring apparatus capable of stably acquiring an entire image of a wafer while transferring the wafer, and a wafer inspection apparatus for detecting defects of the wafer using the entire image of the wafer.

In accordance with an aspect of the present invention, an image acquiring method may include continuously acquiring partial images having a predetermined size by imaging a scan area perpendicular to a transfer path of a wafer using a line scan camera disposed above the transfer path of the wafer, detecting a partial image including a predetermined feature point from among the partial images, and merging a predetermined number of partial images including the detected partial image to acquire an entire image of the wafer.

In accordance with some embodiments of the present invention, each of the partial images may include a region of interest (ROI) for detecting the feature point.

In accordance with some embodiments of the present invention, the image acquiring method may further include receiving a motion event signal of a wafer transfer robot for transferring the wafer, and providing an illumination light for acquiring the partial images based on the motion event signal.

In accordance with some embodiments of the present invention, the partial images may be continuously acquired for a predetermined time after the illumination light is provided.

In accordance with some embodiments of the present invention, the image acquiring method may further include storing the partial images.

In accordance with some embodiments of the present invention, the partial images may be stored in an image storage unit having a predetermined storage space, and when the storage space for storing the partial images is insufficient, the partial images may be deleted in an order in which the partial images are stored.

In accordance with another aspect of the present invention, an image acquiring apparatus may include a line scan camera disposed above a transfer path of a wafer and for continuously acquiring partial images having a predetermined size by imaging a scan area perpendicular to the transfer path of the wafer, an image storage unit for storing the partial images, an image analysis unit for detecting a partial image including a predetermined feature point from among the partial images, and an image merging unit merging a predetermined number of partial images including the detected partial image to acquire an entire image of the wafer.

In accordance with some embodiments of the present invention, the image analysis unit may set a ROI in the partial images and may analyze ROIs of the partial images to detect the partial image including the feature point.

In accordance with some embodiments of the present invention, the image acquiring apparatus may further include an illumination unit for receiving a motion event signal of a wafer transfer robot for transferring the wafer from a wafer processing apparatus including the wafer transfer robot and providing an illumination light for acquiring the partial images based on the motion event signal.

In accordance with some embodiments of the present invention, the line scan camera may continuously acquire the partial images for a predetermined time after the illumination light is provided.

In accordance with some embodiments of the present invention, the image acquiring apparatus may further include an illumination control unit for controlling operations of the illumination unit based on the motion event signal, and a camera control unit for controlling operations of the line scan camera to continuously acquire the partial images for the predetermined time after the illumination light is provided.

In accordance with some embodiments of the present invention, the image storage unit may have a predetermined storage space for storing the partial images and may delete the partial images in an order in which the partial images are stored when the storage space for storing the partial images is insufficient.

In accordance with still another aspect of the present invention, a wafer inspection apparatus may include a line scan camera disposed above a transfer path of a wafer and for continuously acquiring partial images having a predetermined size by imaging a scan area perpendicular to the transfer path of the wafer, an image storage unit for storing the partial images, an image analysis unit for detecting a partial image including a predetermined feature point from among the partial images, an image merging unit merging a predetermined number of partial images including the detected partial image to acquire an entire image of the wafer, and an image inspection unit for detecting defects of the wafer from the entire image of the wafer.

In accordance with some embodiments of the present invention, each of the partial images may include a ROI for detecting the feature point.

In accordance with some embodiments of the present invention, the wafer inspection apparatus may further include an illumination unit for providing an illumination light on the scan area, and an illumination control unit connected to a wafer processing apparatus including a wafer transfer robot for transferring the wafer and configured to receive a motion event signal of the wafer transfer robot from the wafer processing apparatus and control operations of the illumination unit based on the motion event signal.

In accordance with some embodiments of the present invention, the illumination control unit may control the operations of the illumination unit so that the illumination light is provided for a predetermined time after the wafer transfer robot starts transferring the wafer.

In accordance with some embodiments of the present invention, the illumination control unit may control the operations of the illumination unit so that the illumination light is provided for a predetermined second time after the wafer transfer robot starts transferring the wafer and then a predetermined first time elapses.

In accordance with some embodiments of the present invention, the wafer inspection apparatus may further include a camera control unit for controlling operations of the line scan camera to continuously acquire the partial images for a predetermined time after the illumination light is provided.

In accordance with some embodiments of the present invention, the image storage unit may have a predetermined storage space for storing the partial images and may delete the partial images in an order in which the partial images are stored when the storage space for storing the partial images is insufficient.

In accordance with some embodiments of the present invention, the image inspection unit may set a second ROI on the entire image of the wafer and may compare the second ROI with a reference image to detect the defects.

The above summary of the invention is not intended to describe each illustrated embodiment or every implementation of the present invention. The detailed description and claims that follow more particularly exemplify these embodiments.

BRIEF DESCRIPTION OF THE DRAWINGS

Embodiments of the present invention can be understood in more detail from the following description taken in conjunction with the accompanying drawings, in which.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Hereinafter, embodiments of the present invention are described in more detail with reference to the accompanying drawings. However, the present invention is not limited to the embodiments described below and is implemented in various other forms. Embodiments below are not provided to fully complete the present invention but rather are provided to fully convey the range of the present invention to those skilled in the art.

In the specification, when one component is referred to as being on or connected to another component or layer, it can be directly on or connected to the other component or layer, or an intervening component or layer may also be present. Unlike this, it will be understood that when one component is referred to as directly being on or directly connected to another component or layer, it means that no intervening component is present. Also, though terms like a first, a second, and a third are used to describe various regions and layers in various embodiments of the present invention, the regions and the layers are not limited to these terms.

Terminologies used below are used to merely describe specific embodiments, but do not limit the present invention. Additionally, unless otherwise defined here, all the terms including technical or scientific terms, may have the same meaning that is generally understood by those skilled in the art.

Embodiments of the present invention are described with reference to schematic drawings of ideal embodiments. Accordingly, changes in manufacturing methods and/or allowable errors may be expected from the forms of the drawings. Accordingly, embodiments of the present invention are not described being limited to the specific forms or areas in the drawings, and include the deviations of the forms. The areas may be entirely schematic, and their forms may not describe or depict accurate forms or structures in any given area, and are not intended to limit the scope of the present invention.

Figure 1:
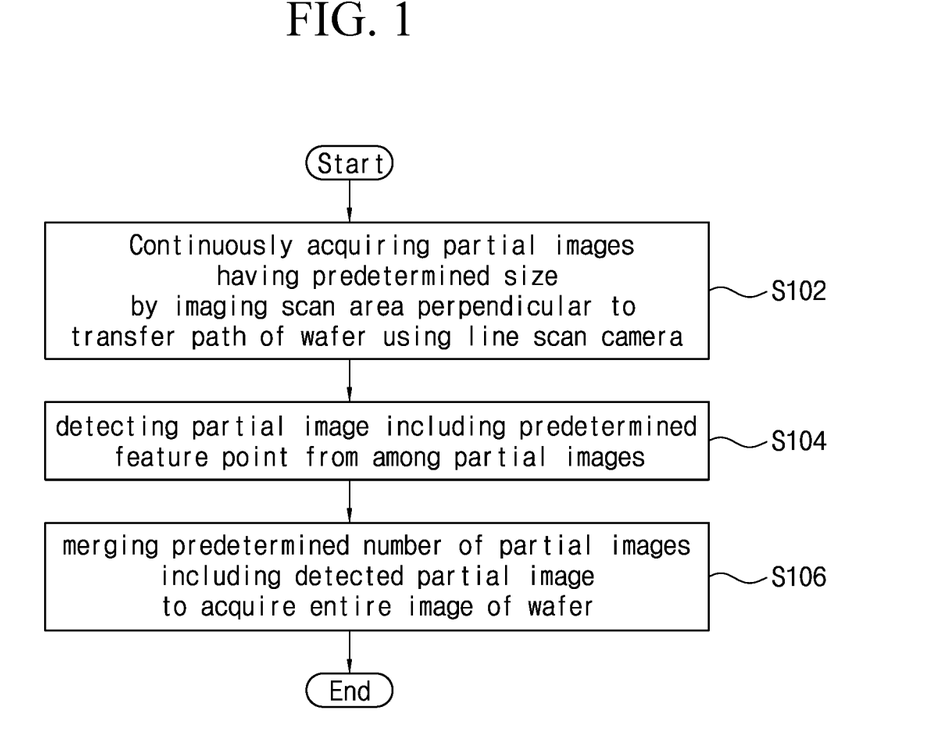
FIG. 1 is a flowchart illustrating an image acquiring method in accordance with an embodiment of the present invention.
Figure 2:
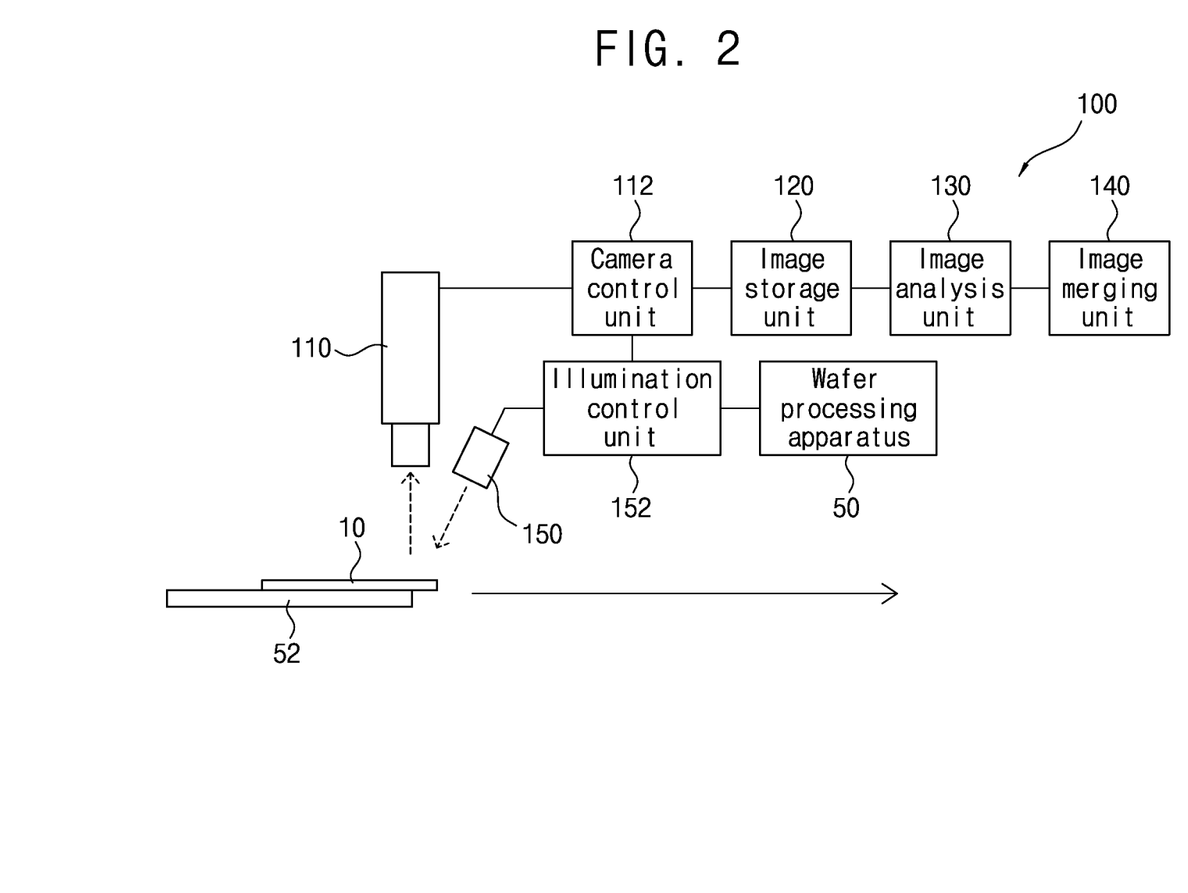
FIG. 2 is a schematic view illustrating an image acquiring apparatus suitable for performing the image acquiring method as shown in FIG. 1.

FIG. 1 is a flowchart illustrating an image acquiring method in accordance with an embodiment of the present invention, and FIG. 2 is a schematic view illustrating an image acquiring apparatus suitable for performing the image acquiring method as shown in FIG. 1.

Referring to FIGS. 1 and 2, an image acquiring method and an image acquiring apparatus 100, in accordance with an embodiment of the present invention, may be used to acquire an image of a wafer 10 for the purpose of inspecting the wafer 10 in a manufacturing process of semiconductor devices. For example, the image acquiring apparatus 100 may be mounted in a wafer processing apparatus 50 for manufacturing semiconductor devices, such as a deposition apparatus, an etching apparatus, a chemical mechanical polishing apparatus, and the like, and may be used to acquire an image of the wafer 10 transferred along a predetermined transfer path in the wafer processing apparatus 50.

The image acquiring apparatus 100 may include a line scan camera 110 disposed above a transfer path of a wafer 10 and for continuously acquiring partial images 20 (refer to FIGS. 3 and 4) having a predetermined size by imaging a scan area extending in a direction perpendicular to the transfer path of the wafer 10, an image storage unit 120 for storing the partial images 20 acquired by the line scan camera 110, an image analysis unit 130 for detecting a partial image 22 (refer to FIGS. 3 and 4) including a predetermined feature point from among the partial images 20, and an image merging unit 140 merging a predetermined number of partial images 20 including the detected partial image 22 to acquire an entire image 30 (refer to FIGS. 5 and 6) of the wafer 10. For example, the image merging unit 140 may merge the detected partial image 22 and partial images 20 before or after the detected image 22.

The wafer processing apparatus 50 may include a wafer transfer robot 52 for transferring the wafer 10, and the wafer transfer robot 52 may include a transfer arm for supporting and transferring the wafer 10. The wafer transfer robot 52 may transfer the wafer 10 along a transfer path extending in a first horizontal direction, and the line scan camera 110 may image a scan area extending in a second horizontal direction perpendicular to the transport path. For example, the line scan camera 110 may be disposed above the transport path and may acquire the partial images 20 by continuously imaging the scan area. For example, each of the partial images 20 may include about 30 to 100 line images.

The image storage unit 120 may have a predetermined storage space for storing the partial images 20 and may sequentially store the partial images 20 acquired by the line scan camera 110. Particularly, when the storage space for storing the partial images 20 is insufficient, the image storage unit 120 may delete the partial images 20 in an order in which the partial images 20 are stored.

Hereinafter, the image acquiring method according to an embodiment of the present invention will be described with reference to the accompanying drawings.

Referring to FIG. 1, in step S102, partial images 20 having a predetermined size may be continuously acquired by imaging a scan area perpendicular to a transfer path of a wafer 10 using a line scan camera 110 disposed above the transfer path of the wafer 10. For example, the line scan camera 110 may be operated all the time rather than only at a specific time based on a trigger signal, and the acquired partial images 20 may be sequentially stored in the image storage unit 120 and deleted sequentially.

In step S104, an image analysis unit 130 may detect a partial image 22 including a predetermined feature point from among the partial images 20. For example, the image analysis unit 130 may set a region of interest (ROI) 20R (refer to FIGS. 3 and 4) in the partial images 20 and may analyze the ROIs 20R of the partial images 20 to detect the partial image 22 including the feature point. Specifically, the image analysis unit 130 may extract ROI images from the partial images 20 and detect the feature point from the ROI images. For example, the feature point may be set in various forms, such as a pattern having a predetermined shape, a predetermined brightness, a predetermined color, a predetermined edge portion of the wafer 10 such as a notch portion, and the like.

Figure 3:
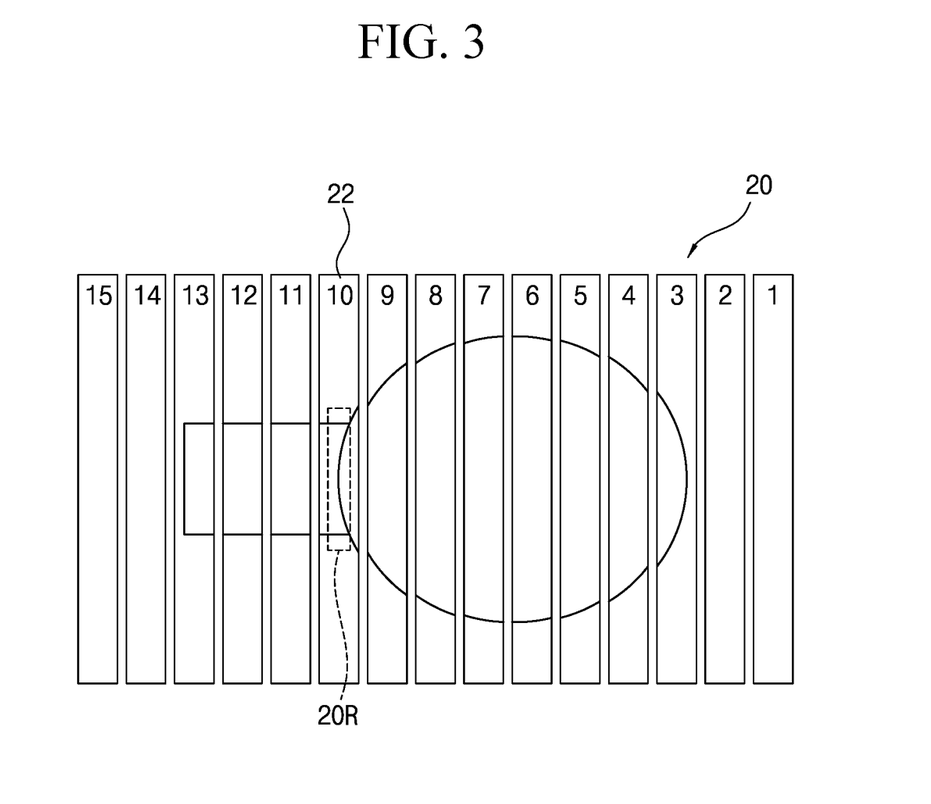
FIG. 3 is a schematic view illustrating partial images acquired when a wafer is moved in a moving direction of the wafer as shown in FIG. 2.
Figure 4:
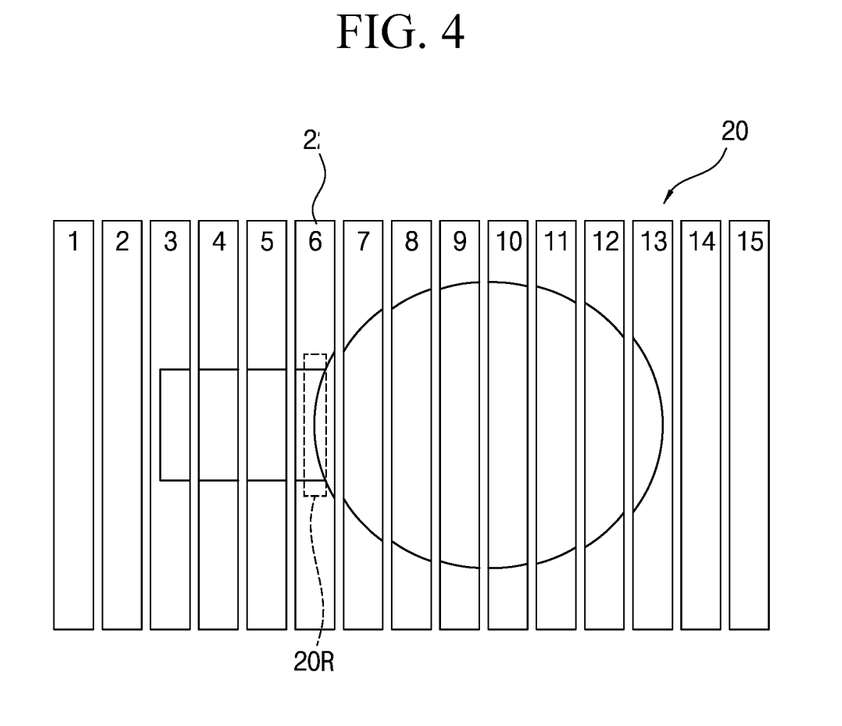
FIG. 4 is a schematic view illustrating partial images acquired when the wafer is moved in a direction opposite to the moving direction of the wafer as shown in FIG. 2.

FIG. 3 is a schematic view illustrating partial images acquired when the wafer is moved in a moving direction of the wafer as shown in FIG. 2, and FIG. 4 is a schematic view illustrating partial images acquired when the wafer is moved in a direction opposite to the moving direction of the wafer as shown in FIG. 2.

Referring to FIGS. 3 and 4, for example, when the feature point includes shape, brightness, color, etc. of a boundary area between the robot arm and the wafer 10, the ROI 20R may be set at a center portion of the partial images 20, and the image analysis unit 130 may detect the partial image 22 including the feature point by monitoring a line shape forming a boundary between the robot arm and the wafer 10, a change in brightness, a change in color, and the like, in the ROIs 20R of the partial images 20. For example, in the case of FIG. 3, the feature point may be detected in partial image No. 10, and, in the case of FIG. 4, the feature point may be detected in partial image No. 6.

In step S106, an image merging unit 140 may merge a predetermined number of partial images 20 including the detected partial image 22 to acquire an entire image 30 of the wafer 10. For example, the image merging unit 140 may merge the detected partial image 22 and partial images 20 before or after the detected image 22.

Figure 5:
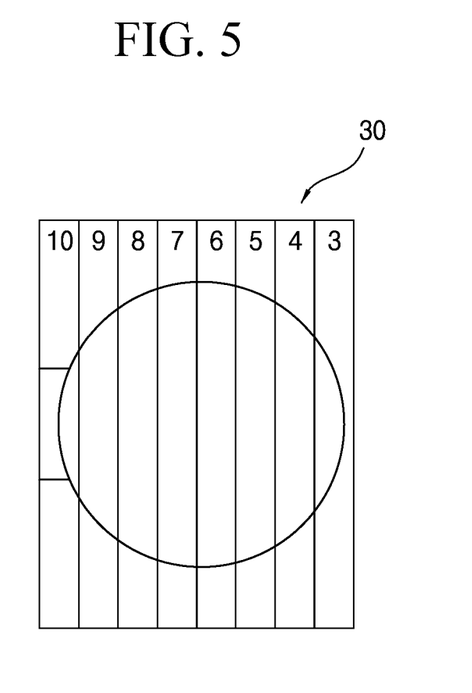
FIG. 5 is a schematic view illustrating an entire image acquired from the partial images as shown in FIG. 3.
Figure 6:
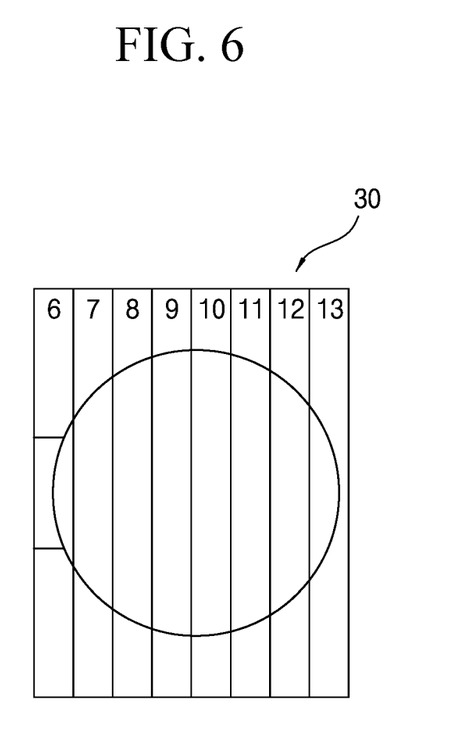
FIG. 6 is a schematic view illustrating an entire image acquired from the partial images as shown in FIG. 4.

FIG. 5 is a schematic view illustrating an entire image acquired from the partial images as shown in FIG. 3, and FIG. 6 is a schematic view illustrating an entire image acquired from the partial images as shown in FIG. 4.

As an example, as shown in FIG. 5, when the feature point is detected in partial image No. 10, the image merging unit 140 may generate the entire image 30 of the wafer 10 by merging eight partial images 20 from partial image No. 3 to partial image No. 10.

As another example, as shown in FIG. 6, when the feature point is detected in partial image No. 6, the image merging unit 140 may generate the entire image 30 of the wafer 10 by merging eight partial images 20 from partial image No. 6 to partial image No. 13.

In accordance with the embodiments of the present invention as described above, the entire image 30 of the wafer 10 may be acquired by merging a predetermined number of partial images 20 including the partial image 22 in which the feature point is detected, and thus there is no need to use a trigger signal as in the prior art. Further, since the ROIs 20R of the partial images 20 may be constantly monitored by the image analysis unit 130, the entire image 30 of the wafer 10 may be stably acquired.

Referring to again FIG. 2, the image acquiring apparatus 100 may include an illumination unit 150 for providing an illumination light onto the scan area and an illumination control unit 152 for controlling operations of the illumination unit 150.

In accordance with an embodiment of the present invention, while the wafer processing apparatus 50 is operated, the illumination control unit 152 may control the operations of the illumination unit 150 so that the illumination light is always provided onto the scan area.

In accordance with another embodiment of the present invention, the illumination control unit 152 may receive a motion event signal of the wafer transfer robot 52 from the wafer processing apparatus 50, and the illumination unit 150 may provide an illumination light for acquiring the partial images 20 based on the motion event signal. Specifically, the illumination control unit 152 may perform on/off control of the illumination unit 150 based on the motion event signal. For example, the illumination control unit 152 may control the operations of the illumination unit 150 so that the illumination light is provided for a predetermined time after the wafer transfer robot 52 starts transferring the wafer 10.

In accordance with still another embodiment of the present invention, the illumination control unit 152 may control the operations of the illumination unit 150 so that the illumination light is provided for a predetermined second time after the wafer transfer robot 52 starts transferring the wafer 10 and then a predetermined first time elapses. In this case, when the wafer transfer robot 52 operates at a relatively long distance from the scan area, unnecessary operation of the illumination unit 150 may be prevented.

In accordance with still another embodiment of the present invention, the illumination control unit 152 may monitor event log files generated by the wafer processing apparatus 50 and may control the operations of the illumination unit 150 according to the monitoring result.

The line scan camera 110 may continuously acquire the partial images 20 for a predetermined time after the illumination light is provided. For example, the image acquiring apparatus 100 may include a camera control unit 112 for controlling operations of the line scan camera 110. The camera control unit 112 may be connected to the illumination control unit 152, and may control the operations of the line scan camera 110 so that the partial images 20 are continuously acquired for a predetermined time after the illumination light is provided. That is, the line scan camera 110 may continuously acquire the partial images 20 by imaging the scan area while the illumination unit 150 is operated.

Figure 7:
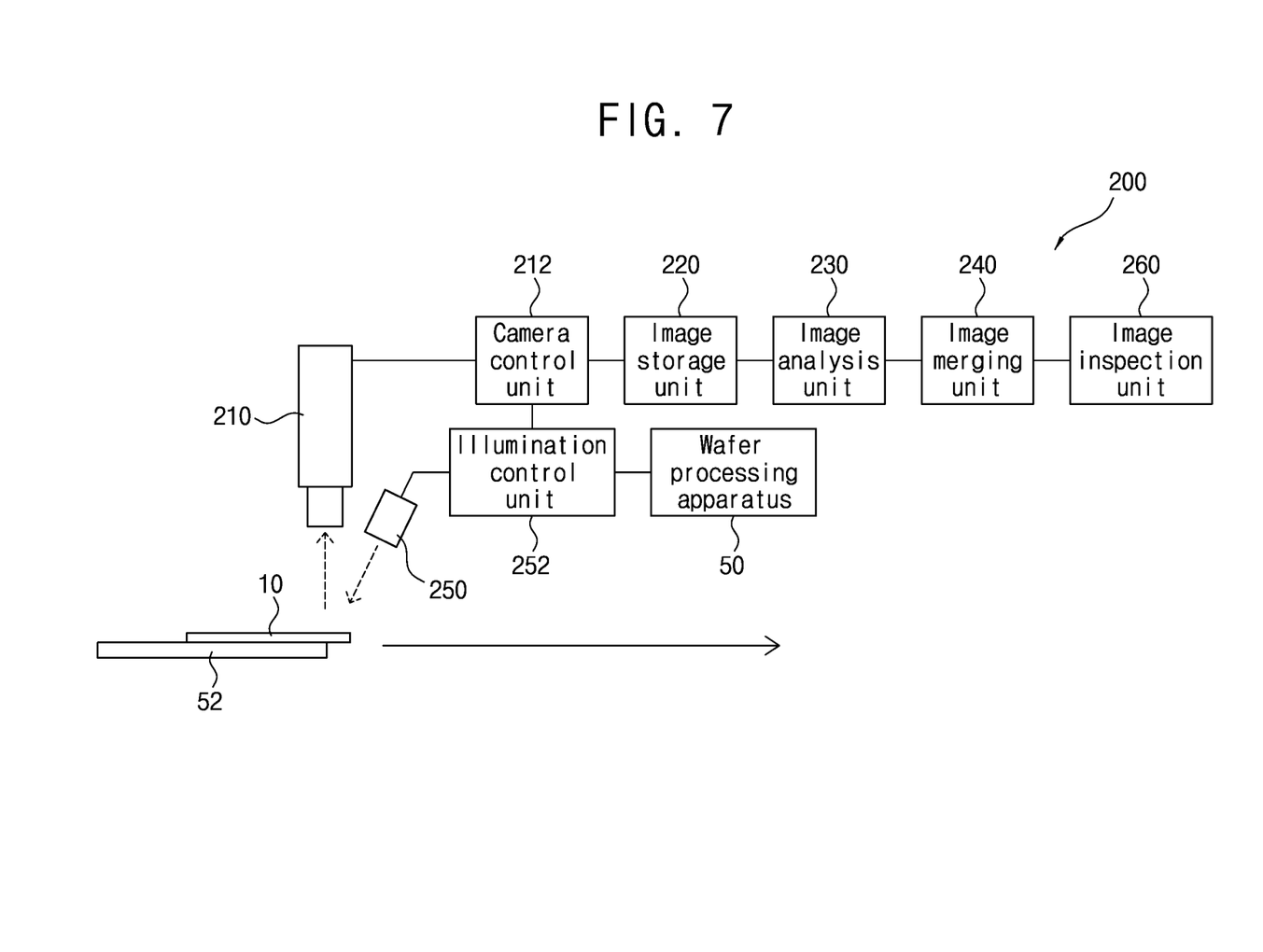
FIG. 7 is a schematic view illustrating a wafer inspection apparatus in accordance with another embodiment of the present invention.

FIG. 7 is a schematic view illustrating a wafer inspection apparatus in accordance with another embodiment of the present invention.

Referring to FIG. 7, a wafer inspection apparatus 200, in accordance with another embodiment of the present invention, may include a line scan camera 210 disposed above a transfer path of a wafer 10 and for continuously acquiring partial images having a predetermined size by imaging a scan area extending in a direction perpendicular to the transfer path of the wafer 10, an image storage unit 220 for storing the partial images, an image analysis unit 230 for detecting a partial image including a predetermined feature point from among the partial images, an image merging unit 240 merging a predetermined number of partial images including the detected partial image to acquire an entire image of the wafer 10, and an image inspection unit 260 for detecting defects of the wafer 10 from the entire image of the wafer. Further, the wafer inspection apparatus 200 may include a camera control unit 212 for controlling operations of the line scan camera 210, an illumination unit 250 for providing an illumination light on the scan area, and an illumination control unit 252 for controlling operations of the illumination unit 250.

The line scan camera 210, the camera control unit 212, the image storage unit 220, the image analysis unit 230, the image merging unit 240, the illumination unit 250 and the illumination control unit 252 are substantially the same as previously described with reference to FIGS. 1 to 6, and thus descriptions thereof will be omitted.

The image inspection unit 260 may analyze the entire image of the wafer 10 acquired by the image merging unit 240 to detect the defects of the wafer 10. For example, the image inspection unit 260 may set a second ROI on the entire image of the wafer 10 and may compare the second ROI with a pre-prepared reference image in order to detect the defects in the wafer 10.

In accordance with the embodiments of the present invention as described above, the line scan camera 110 may continuously acquire partial images 20 having a predetermined size by imaging a scan area including a portion of a transfer path of the wafer 10, and the image analysis unit 130 may analyze the partial images 20 to detect a partial image 22 including a predetermined feature point. The image merging unit 140 may acquire an entire image 30 of the wafer 10 by merging a predetermined number of partial images 20 including the detected partial images 22. As a result, it is possible to stably acquire the entire image 30 of the wafer 10 without using a trigger signal as in the prior art, and thus the reliability of a wafer inspection process using the entire image 30 of the wafer 10 may be significantly improved.

Although the example embodiments of the present invention have been described with reference to the specific embodiments, they are not limited thereto. Therefore, it will be readily understood by those skilled in the art that various modifications and changes can be made thereto without departing from the spirit and scope of the appended claims.

The invention claimed is:

1. An image acquiring method comprising:
    continuously acquiring partial images having a predetermined size by imaging a scan area perpendicular to a transfer path of a wafer using a line scan camera disposed above the transfer path of the wafer;
    detecting a partial image including a predetermined feature point from among the partial images; and
    merging a predetermined number of partial images including the detected partial image to acquire an entire image of the wafer.

2. The image acquiring method of claim 1, wherein each of the partial images comprises a region of interest (ROI) for detecting the feature point.

3. The image acquiring method of claim 1, further comprising:
    receiving a motion event signal of a wafer transfer robot for transferring the wafer; and
    providing an illumination light for acquiring the partial images based on the motion event signal.

4. The image acquiring method of claim 3, wherein the partial images are continuously acquired for a predetermined time after the illumination light is provided.

5. The image acquiring method of claim 1, further comprising storing the partial images.

6. The image acquiring method of claim 5, wherein the partial images are stored in an image storage unit having a predetermined storage space, and when the storage space for storing the partial images is insufficient, the partial images are deleted in an order in which the partial images are stored.

7. An image acquiring apparatus comprising:
    a line scan camera disposed above a transfer path of a wafer and for continuously acquiring partial images having a predetermined size by imaging a scan area perpendicular to the transfer path of the wafer;
    an image storage unit for storing the partial images;
    an image analysis unit for detecting a partial image including a predetermined feature point from among the partial images; and an image merging unit merging a predetermined number of partial images including the detected partial image to acquire an entire image of the wafer.

8. The image acquiring apparatus of claim 7, wherein the image analysis unit sets a ROI in the partial images and analyzes ROIs of the partial images to detect the partial image including the feature point.

9. The image acquiring apparatus of claim 7, further comprising:
an illumination unit for receiving a motion event signal of a wafer transfer robot for transferring the wafer from a wafer processing apparatus including the wafer transfer robot and providing an illumination light for acquiring the partial images based on the motion event signal.

10. The image acquiring apparatus of claim 9, wherein the line scan camera continuously acquires the partial images for a predetermined time after the illumination light is provided.

11. The image acquiring apparatus of claim 10, further comprising:
an illumination control unit for controlling operations of the illumination unit based on the motion event signal; and
a camera control unit for controlling operations of the line scan camera to continuously acquire the partial images for the predetermined time after the illumination light is provided.

12. The image acquiring apparatus of claim 7, wherein the image storage unit has a predetermined storage space for storing the partial images and deletes the partial images in an order in which the partial images are stored when the storage space for storing the partial images is insufficient.

13. A wafer inspection apparatus comprising:
a line scan camera disposed above a transfer path of a wafer and for continuously acquiring partial images having a predetermined size by imaging a scan area perpendicular to the transfer path of the wafer;
an image storage unit for storing the partial images;
an image analysis unit for detecting a partial image including a predetermined feature point from among the partial images;
an image merging unit merging a predetermined number of partial images including the detected partial image to acquire an entire image of the wafer; and
an image inspection unit for detecting defects of the wafer from the entire image of the wafer.

14. The wafer inspection apparatus of claim 13, wherein each of the partial images comprises a ROI for detecting the feature point.

15. The wafer inspection apparatus of claim 13, further comprising:
an illumination unit for providing an illumination light on the scan area; and
an illumination control unit connected to a wafer processing apparatus including a wafer transfer robot for transferring the wafer and configured to receive a motion event signal of the wafer transfer robot from the wafer processing apparatus and control operations of the illumination unit based on the motion event signal.

16. The wafer inspection apparatus of claim 15, wherein the illumination control unit controls the operations of the illumination unit so that the illumination light is provided for a predetermined time after the wafer transfer robot starts transferring the wafer.

17. The wafer inspection apparatus of claim 15, wherein the illumination control unit controls the operations of the illumination unit so that the illumination light is provided for a predetermined second time after the wafer transfer robot starts transferring the wafer and then a predetermined first time elapses.

18. The wafer inspection apparatus of claim 15, further comprising:
a camera control unit for controlling operations of the line scan camera to continuously acquire the partial images for a predetermined time after the illumination light is provided.

19. The wafer inspection apparatus of claim 13, wherein the image storage unit has a predetermined storage space for storing the partial images and deletes the partial images in an order in which the partial images are stored when the storage space for storing the partial images is insufficient.

20. The wafer inspection apparatus of claim 13, wherein the image inspection unit sets a second ROI on the entire image of the wafer and compares the second ROI with a reference image to detect the defects.

* * * * *